(12) United States Patent
Ono

(10) Patent No.: US 11,701,860 B2
(45) Date of Patent: Jul. 18, 2023

(54) STRUCTURE, STRUCTURE FOR VEHICLES, AND AIR CONDITIONING DUCT FOR VEHICLES

(71) Applicant: KYORAKU CO., LTD., Kyoto (JP)

(72) Inventor: Yoshinori Ono, Kanagawa (JP)

(73) Assignee: KYORAKU CO., LTD., Kyoto (JP)

( * ) Notice: Subject to any disclaimer, the term of this patent is extended or adjusted under 35 U.S.C. 154(b) by 277 days.

(21) Appl. No.: 16/635,705

(22) PCT Filed: Aug. 15, 2018

(86) PCT No.: PCT/JP2018/030324
§ 371 (c)(1),
(2) Date: Jan. 31, 2020

(87) PCT Pub. No.: WO2019/039360
PCT Pub. Date: Feb. 28, 2019

(65) Prior Publication Data
US 2021/0362464 A1  Nov. 25, 2021

(30) Foreign Application Priority Data

Aug. 25, 2017 (JP) .................................. 2017-161875

(51) Int. Cl.
*B32B 5/08* (2006.01)
*B32B 1/08* (2006.01)
(Continued)

(52) U.S. Cl.
CPC .................. *B32B 5/18* (2013.01); *B32B 1/08* (2013.01); *B32B 5/022* (2013.01); *B32B 5/245* (2013.01);
(Continued)

(58) Field of Classification Search
CPC ... B32B 1/08; B32B 2250/02; B32B 2250/22; B32B 2266/0278; B32B 2266/08;
(Continued)

(56) References Cited

U.S. PATENT DOCUMENTS 5,795,634 A * 8/1998 Fukui ..................... B32B 1/08
428/36.1
2011/0262736 A1  10/2011 Sumi
2013/0118831 A1  5/2013 Kawai et al.

FOREIGN PATENT DOCUMENTS

EP        2595142 A1    5/2013
JP        2003306025 A  10/2003
(Continued)

OTHER PUBLICATIONS

Extended European Search Report dated Aug. 19, 2020, of corresponding European application No. 18848247.5; 7 pages.
(Continued)

*Primary Examiner* — Yan Lan
(74) *Attorney, Agent, or Firm* — Maier & Maier, PLLC

(57) ABSTRACT

The present invention provides a structure that improves sound absorption coefficient. The present invention provides a structure comprising: a foam resin layer formed of a foam material having a foaming ratio of 1.1 to 8 times; and a sound absorbing layer formed of a foam material having a foaming ratio of 10 to 30 times, the sound absorbing layer laminated on the foam resin layer.

5 Claims, 5 Drawing Sheets

(51) Int. Cl.
| | |
|---|---|
| *B32B 7/12* | (2006.01) |
| *B32B 5/02* | (2006.01) |
| *B32B 5/24* | (2006.01) |
| *B32B 5/32* | (2006.01) |
| *G10K 11/168* | (2006.01) |
| *F16L 9/133* | (2006.01) |
| *F16L 9/21* | (2006.01) |
| *B32B 5/18* | (2006.01) |
| *B60H 1/00* | (2006.01) |

(52) U.S. Cl.
CPC ............... *B32B 5/32* (2013.01); *B32B 7/12* (2013.01); *B60H 1/00564* (2013.01); *F16L 9/133* (2013.01); *F16L 9/21* (2013.01); *G10K 11/168* (2013.01); *B32B 2250/02* (2013.01); *B32B 2250/22* (2013.01); *B32B 2266/0278* (2013.01); *B32B 2266/08* (2013.01); *B32B 2307/102* (2013.01); *B32B 2597/00* (2013.01); *B32B 2605/00* (2013.01)

(58) Field of Classification Search
CPC . B32B 2307/102; B32B 2605/00; B32B 5/18; B32B 5/32; B32B 7/12; B32B 2266/025; B32B 2266/06; B32B 2307/732; B32B 2597/00; B32B 5/022; B32B 5/245; B60H 1/00564; B60H 1/00; F16L 9/133; F16L 9/21; G10K 11/168; G10K 11/162
See application file for complete search history.

(56) References Cited

FOREIGN PATENT DOCUMENTS

| | | | |
|---|---|---|---|
| JP | 2004-114454 A | | 4/2004 |
| JP | 2005-335684 A | | 12/2005 |
| JP | 2009280155 A | | 12/2009 |
| JP | 2012-145627 A | | 8/2012 |
| JP | 2017-083081 A | | 5/2017 |
| JP | 2017083081 | * | 5/2017 |
| JP | 2017-132287 A | | 8/2017 |
| WO | WO2015/102291 | * | 7/2015 |

OTHER PUBLICATIONS

International Search Report dated Oct. 23, 2018 in corresponding International Application No. PCT/JP2018/030324; 3 pages.
Office Action dated Apr. 17, 2023, in corresponding Korean Application No. 10-2020-7003675, 10 pages.

* cited by examiner

STRUCTURE, STRUCTURE FOR VEHICLES, AND AIR CONDITIONING DUCT FOR VEHICLES

TECHNICAL FIELD

The present invention relates to a structure, a structure for vehicles, and an air conditioning duct for vehicles.

BACKGROUND ART

It is known that resin structures for vehicles are provide in, for example, vehicle structures such as automobile. Patent Literature 1 discloses that a vehicle seat pad includes an air distribution duct, which is an example of the vehicle structure, and a pad body foam-molded with a duct inserted.

CITATION LIST

Patent Literature

[Patent Literature 1] Japanese Unexamined Patent Application Publication No. 2017-132287

SUMMARY OF INVENTION

Technical Problem

Then, such structures may preferably absorb ambient sounds.

The present invention has been made in view of the foregoing, and an object thereof is to provide a structure that improves sound absorption coefficient.

Solution to Problem

The present invention provides a structure comprising: a foam resin layer formed of a foam material having a foaming ratio of 1.1 to 8 times; and a sound absorbing layer formed of a foam material having a foaming ratio of 10 to 30 times, the sound absorbing layer laminated on the foam resin layer.

The present inventor succeeds in greatly improving the sound absorption coefficient of the structure as compared with the prior art, and thus completes the present invention by laminating the sound absorbing layer on the foam resin layer and combining the foam resin layer with a specific foaming ratio and the sound absorbing layer with a specific foaming ratio.

Various embodiments of the present invention are described below. Any of the embodiments described below can be combined with one another.

Preferably, embodiments further comprise: a cylindrical portion formed of the foam resin layer.

Preferably, the cylindrical portion includes a part provided in an outside of the cylindrical portion, the sound absorbing layer is laminated on at least a part provided on an outside of the cylindrical portion.

Preferably, a value obtained by dividing a thickness of the sound absorbing layer by a thickness of the foam resin layer is 1 to 10.

Preferably, the sound absorbing layer is stick to the foam resin layer with a double-sided tape or a bonding agent.

Preferably, the foam resin layer has a closed-cell structure, and the sound absorbing layer has an open-cell structure.

Preferably, the foam resin layer is made from foamed polyolefin, and the sound absorbing layer is made from foamed polyurethane.

Preferably, a vehicle structure comprises the structure of any one of the above structures.

Preferably, the sound absorbing layer is laminated so as to be directed outside a vehicle in a state that the structure for vehicles is attached to the vehicle.

Preferably, an air conditioning duct for vehicles comprising the vehicle structure comprises: a cylindrical portion formed of the foam resin layer, wherein the cylindrical portion includes a part provided on an outside of the cylindrical portion, the sound absorbing layer is laminated on at least the part of the cylindrical portion.

Preferably, the sound absorbing layer is laminated so as to be directed downwardly in a state that the air conditioning duct for vehicles is attached to the vehicle.

DESCRIPTION OF EMBODIMENTS

Embodiments of the present invention will be described below. Any of features in the embodiments described below can be combined with one another. And the invention is established independently for each feature.

1. Structure 1

Figure 1:
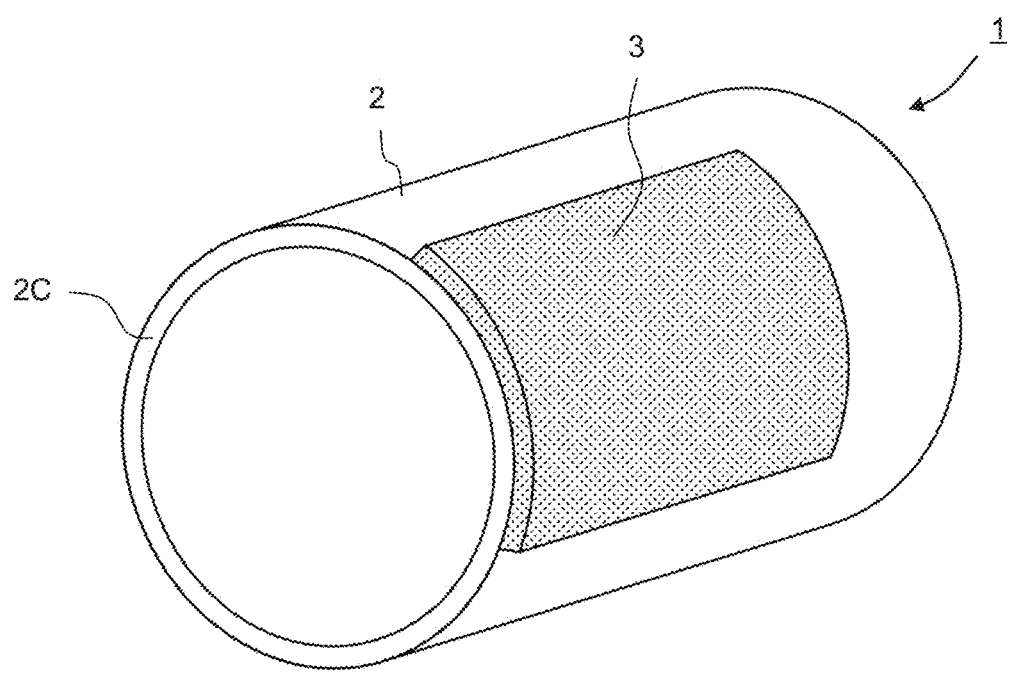
FIG. 1 is a perspective view of a structure 1 according to an embodiment of the present invention.

The structure 1 according to the embodiment of the present invention will be described by referring to FIG. 1. The structure 1 according to the embodiment is applicable to vehicle structures, such as duct and door trim, provided in automobiles. In the present embodiment, the structure 1 applied to the duct (the vehicle structure) will be described. And in FIG. 1, only a part of the structure is illustrated.

The structure 1 comprises a foam resin layer 2 and a sound absorbing layer 3. In the present embodiment, the foam resin layer 2 is formed of a foam material. The foam resin layer 2 is foamed particularly of the foam material having a closed-cell structure in which cells are independent. And a foaming ratio of the foam resin layer 2 is, for example, 1.1 to 8 times, and preferably 1.2 to 4 times. Further, the foaming ratio of the foam resin layer 2 is, for example, 1.1, 1.2, 1.5, 2, 2.5, 3, 3.5, 4, 4.5, 5, 5.5, 6, 6.5, 7, 7.5, or 8 times, and may be within a range between any two of the foaming ratios listed above. In the present embodiment, the structure 1 comprises a cylindrical portion 2C formed of the foam resin layer 2. A thickness of the foam resin layer 2 is, for example, 1 to 5 mm. Then, material that make up the foam resin layer 2 is not specifically limited, and may be, for example, polyolefins such as polypropylene and polyethylene.

In the present embodiment, the sound absorbing layer 3 is formed of a foam material. The sound absorbing layer 3 is foamed particularly of the foam material having an open-cell structure in which cells are provided continuously. A foaming ratio of the sound absorbing layer 3 is, for example, 10 to 30 times, and preferably 15 to 25 times. Further, the foaming ratio of the sound absorbing layer 3 is, for example, 10, 11, 12, 13, 14, 15, 16, 17, 18, 19, 20, 21, 22, 23, 24, 25, 26, 27, 28, 29, or 30 times, and may be within a range between any two of the foaming ratios listed above. And the cylindrical portion 2C includes the part provided in an outside of the cylindrical portion 2C, the sound absorbing layer 3 is laminated on at least the part of the cylindrical portion 2C.

In the present embodiment, a thickness of the sound absorbing layer 3 is 1 to 20 mm And the thickness of the sound absorbing layer 3 divided by the thickness of the foam resin layer 2 is, for example, 1 to 10, and is preferably 1.5 to 5, and is more preferably 2 to 2.5. Further, the thickness of the sound absorbing layer 3 divided by the thickness of the foam resin layer 2 is, for example, 1, 1.5, 2, 2.5, 3, 3.5, 4, 4.5, 5, 5.5, 6, 6.5, 7, 7.5, 8, 8.5, 9, 9.5, or 10, and may be within a range between any two of the divided values listed above. And a method for laminating the sound absorbing layer 3 is not specifically limited, the sound absorbing layer 3 is stuck to the foam resin layer 2 with for example a double-sided tape or a bonding agent. And material that make up the sound absorbing layer 3 is not specifically limited, and may be, for example, foamed polyurethane.

Here, when the vehicle structure is the structure 1, the sound absorbing layer 3 is laminated preferably so as to be directed outside the vehicle in a state that the vehicle structure is attached to the vehicle, thus improving the sound absorption coefficient of the structure 1 with respect to sounds generated during running. In particular, when the structure 1 is the air conditioning duct for vehicles, it is preferable that the structure 1 includes the cylindrical portion 2C formed of the foam resin layer 2, and the sound absorbing layer 3 is laminated on at least the part of the cylindrical portion 2C. Then, the cylindrical portion 2C includes the part provided in the outside of the cylindrical portion 2C. And the sound absorbing layer 3 is preferably laminated so as to be directed downward (directed toward the road surface) in a state that the air conditioning duct for vehicles (the structure) is attached to the vehicle.

And it is preferable to apply the present embodiment to, especially an instrument panel duct, in the vehicle structures. An air outlet of the instrument panel duct faces persons sitting in the driver's seat and passenger's seat, the air outlet is close to the persons, and the outlet from the air conditioner is short, thus requiring particularly high sound absorption.

2. Configuration of Molding Machine 6

Figure 2:
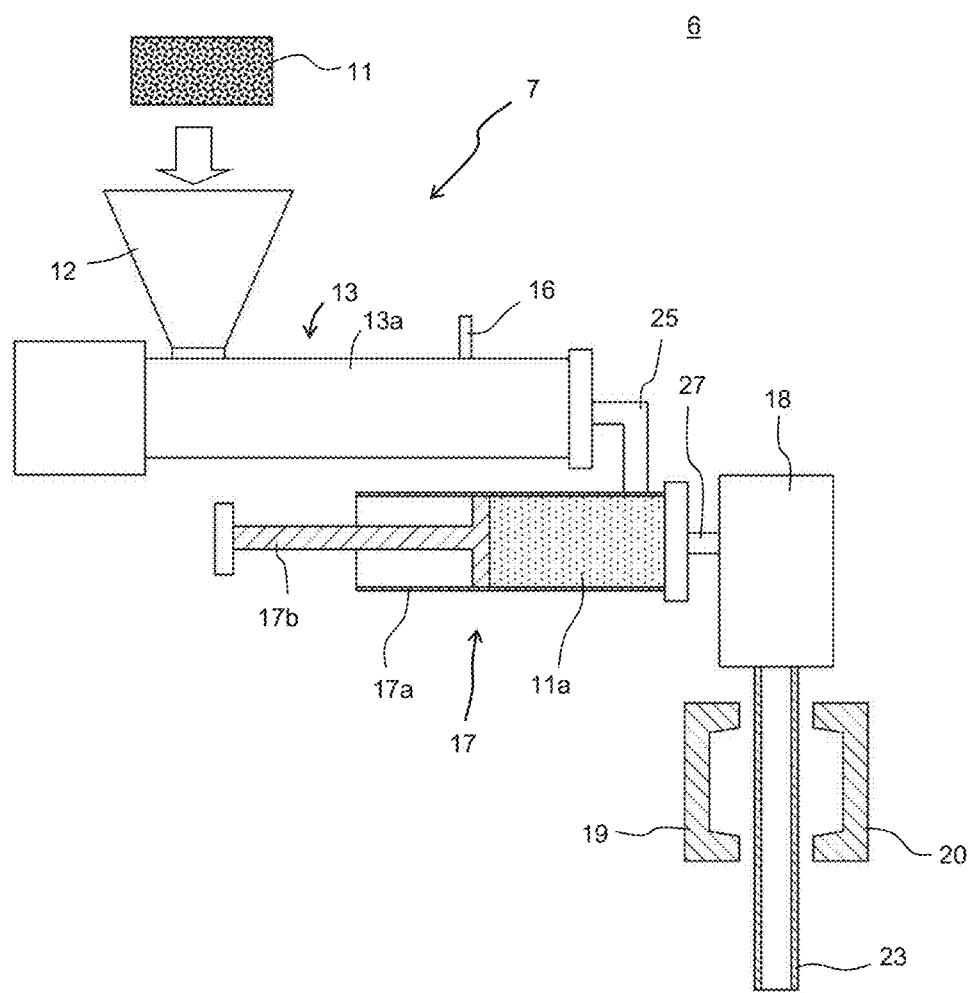
FIG. 2 is a view of an example molding machine 6 applicable to a method for manufacturing the structure 1 according to the embodiment of the present invention. Here, shapes of the split molds 19 and 20 are simplified.

A molding machine 6 applicable to a method for manufacturing the structure 1 will be described with reference to FIG. 2. The molding machine 6 includes a resin supply device 7, a head 18, and split molds 19 and 20. The resin supply device 7 includes a hopper 12, an extruder 13, an injector 16, and an accumulator 17. The extruder 13 and the accumulator 17 are connected via a connecting pipe 25. The accumulator 17 and the head 18 are connected via a connecting pipe 27.

Each configuration will be described in detail below.

Hopper 12 and Extruder 13

The hopper 12 supplies the raw resin 11 with a cylinder 13a of the extruder 13. The raw resin 11 is not specifically limited, the raw resin 11 is commonly in a pellet form. The raw resin 11 is thermoplastic resin such as polyolefin, and examples of the polyolefin include low density polyethylene, linear low density polyethylene, high density polyethylene, polypropylene, ethylene-propylene copolymer, and a mixture thereof. After the raw resin 11 supplied to the cylinder 13a via the hopper 12, the raw resin 11 is melted by being heated in the cylinder 13a and changed to molten resin 11a. And the molten resin 11a is supplied to an end of the cylinder 13a by rotation of a screw provided in the cylinder 13a. The screw is provided in the cylinder 13a, and the rotation of the screw makes the molten resin 11a mixed and conveys the molten resin 11a. The screw has a base provided with a gear device that drives the screw. A number of the screw provided in the cylinder 13a may be one, or equal to or more than two.

Injector 16

The injector 16 for injecting foaming agent into the cylinder 13a is provided with the cylinder 13a. The foaming agent injected into the injector 16 is, for example, a physical foaming agent, a chemical foaming agent, and a mixture thereof. Then, the physical foaming agent is preferable as the foaming agent injected into the injector 16. In the physical foaming agents, inorganic physical foaming agents such as air, carbon dioxide gas, nitrogen gas, and water, and organic physical foaming agents such as butane, pentane, hexane, dichloromethane, dichloroethane, and their supercritical fluids are applicable to the present embodiment. In the supercritical fluid, it is preferable to use carbon dioxide or nitrogen. Nitrogen in the supercritical fluid state can be obtained by setting nitrogen to the critical temperature of 149.1° C. and the critical pressure of 3.4 MPa or more. And carbon dioxide in the supercritical fluid state can be obtained by setting carbon dioxide to the critical temperature of 31° C. and the critical pressure of 7.4 MPa or more. The chemical foaming agent can be obtained by generating carbon dioxide gas by chemical reaction between an acid (e.g. citric acid or a salt thereof) and a base (e.g. sodium bicarbonate). Instead of injecting from the injector 16, the chemical foaming agent may be introduced from the hopper 12.

Accumulator 17 and Head 18

The molten resin 11a added the foaming agent is extruded from a resin outlet of the cylinder 13a and is injected into the accumulator via the connecting pipe 25. The accumulator 17 includes a cylinder 17a configured to reserve the molten resin 11a, and a piston 17b configured to slide inside the cylinder 17a. Then, the piston 17b moves after the cylinder 17a have reserved predetermined amount the molten resin 11a, thus extruding and hanging downwardly the molten resin 11a from a die slit provided in the head 18. The molten resin 11a extruded from the die slit forms a parison 23. A shape of the parison 23 is not specifically limited, may be a cylindrical shape or a sheet shape.

Split Molds 19 and 20

The parison 23 is supplied to between a pair of the split molds 19 and 20. By using the split molds 19 and 20, the molding method according to the present embodiment can form a molded body by molding the parison 23. The molding method using the split molds 19 and 20 is not specifically limited, may be blow molding, vacuum molding or a combination thereof. In the blow molding, the parison 23 is molded with blowing the air into cavities of the split molds 19 and 20. In vacuum molding, the parison 23 is molded by extracting air in the cavities of the split molds 19 and 20 from inner surfaces of the cavities and reducing the pressure in the cavities. The molten resin 11a includes the foaming agent, so the parison 23 becomes the foaming parison and the molded body becomes the foaming molded body.

In the molding method, using the molding machine 6, according to the present embodiment, the structure 1 is manufactured by performing a parison forming process, a molding process, and post-processing process.

Paris on Forming Process

In parison forming process, the molten resin 11a is extruded from the head 18 and hanged downwardly from the head 18 to form the parison 23, and the parison is arranged between the split molds 19 and 20. The split mold 19 includes the cavity defined by a pinch-off portion, and the split mold 20 includes the cavity defined by a pinch-off portion.

Molding Process

In molding process, the molded body is molded by clamping the split molds 19 and 20 and molding the parison 23.

Post-Processing Process

In post-processing process, the molded body with a burr is removed from the split molds 19 and 20, and the burr is cut off from the molded body.

3. Measuring Device for Sound Absorption Coefficient of Structure 1

Figure 3:
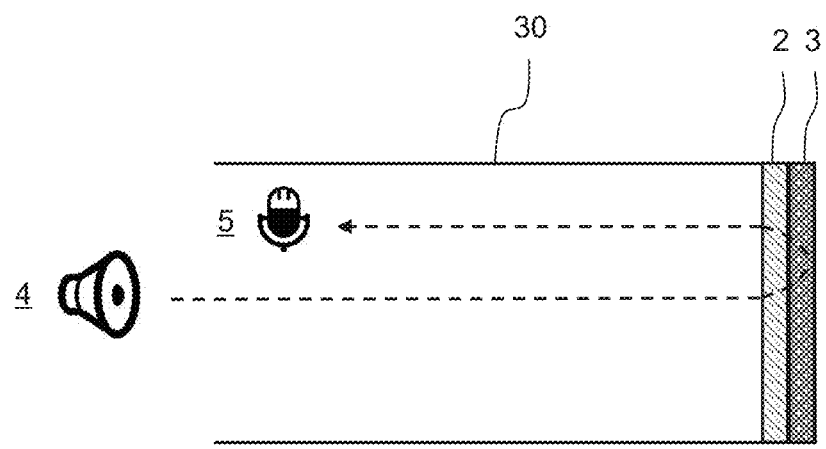
FIG. 3 is a diagram illustrating a measuring device for measuring the sound absorption coefficient of the structure 1.

Then, the measuring device of the sound absorption coefficient of the structure 1 will be described with reference to FIG. 3. In the present embodiment, samples (parts cut out from the foam resin layer 2 and the sound absorbing layer 3) are installed in a thin tube 30, and sound is output from the speaker 4. Then, the sound pressures of output sound and reflected sound are measured by the microphone 5, and the sound absorption coefficient is obtained from attenuation of the sound pressures of the output sound and the reflected sound. In an example of FIG. 3, the sound is input from a side of an inner wall (the foam resin layer 2) formed in the cylindrical portion 2C.

4. Sound Absorption Coefficient Measurement Result of Structure 1

Sound absorption coefficient measurement results of the structure 1 will be described with reference to FIGS. 4 and 5. In the present embodiment, the thin tube 30 has a diameter of 29 mm in accordance with ISO10534-2. The foam resin layer 2 is made from polypropylene, and the sound absorbing layer 3 is made from foamed polyurethane. Then, frequency of the output sound of the speaker 4 is changed from 100 to 6000 Hz, and the sound absorption coefficients are obtained for each frequency of the output sound. The measurement results of the four samples are shown below. The measurement condition for each measurement result is when the sounds are input from the side of the inner wall (the foam resin layer 2) formed in the cylindrical portion 2C and a side of an outer wall (the sound absorbing layer 3) formed in the cylindrical portion 2C. Here, the duct D corresponds to the structure 1.

Duct A

The foam resin layer 2: Foaming ratio 0, Thickness 1.3 mm

The sound absorbing layer 3: None

Duct B

The foam resin layer 2: Foaming ratio 0, Thickness 1.3 mm

The sound absorbing layer 3: Foaming ratio 20 times, Thickness 3 mm

Duct C

The foam resin layer 2: Foaming ratio 2.5 times, Thickness 1.5 mm

The sound absorbing layer 3: None

Duct D

The foam resin layer 2: Foaming ratio 2.5 times, Thickness 1.5 mm

The sound absorbing layer 3: Foaming ratio 20 times, Thickness 3 mm 4-1. Sound Absorption Coefficient for Input Sound from Side of Inner Wall of Cylindrical Portion 2C

Figure 4:
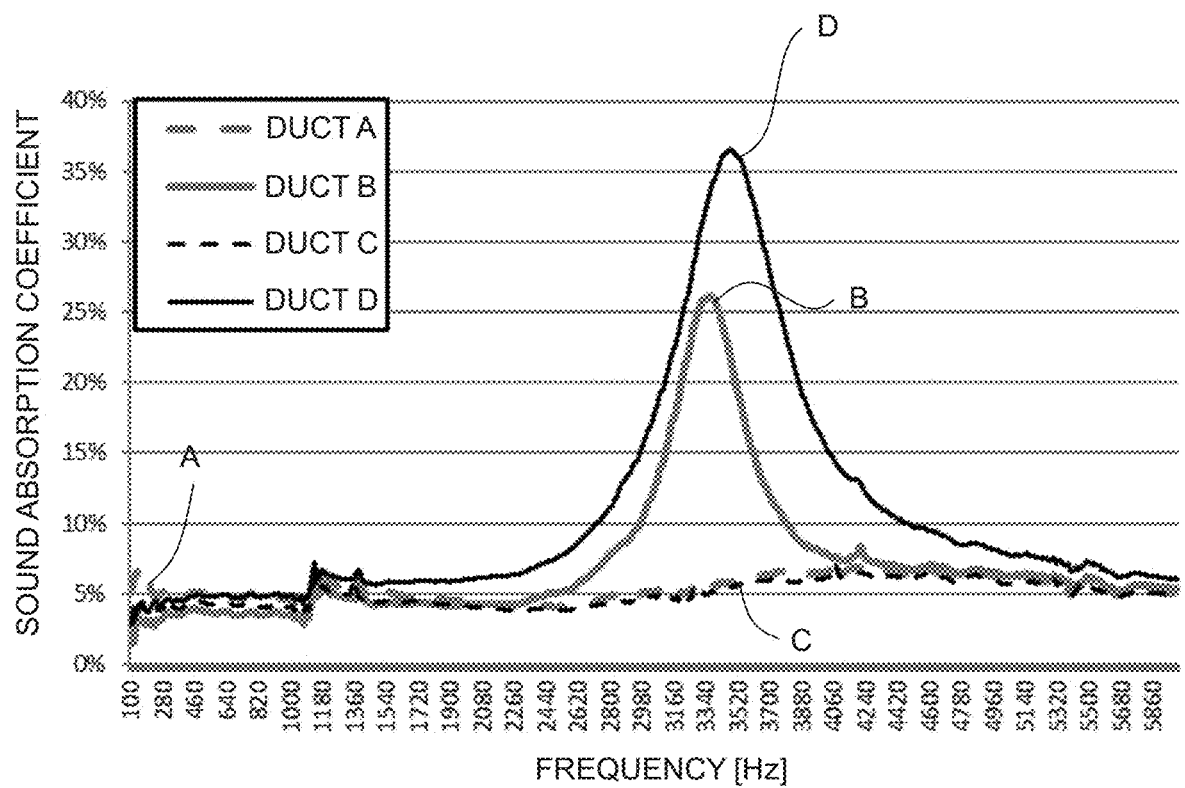
FIG. 4 is a graph showing measuring results of the sound absorption coefficient with respect to input sound from a side of an inner wall formed in the cylindrical portion 2C.

FIG. 4 is a graph illustrating the measurement results of the sound absorption coefficient with respect to the input sound from the side of the inner wall (the foam resin layer 2) of the cylindrical portion 2C. The sound absorption coefficients of the ducts A and C, including no sound absorbing layer 3, are substantially equal. In the ducts B and D including the sound absorbing layer 3, sound absorption coefficient peaks reach 26% and 37% respectively, compared with the ducts without the sound absorbing layer 3. In the ducts B and D, the sound absorption coefficient peaks are seen when the input sound is in a range of 3,300 to 3,600 Hz. As shown the results of the ducts B and D, when the duct includes the sound absorbing layer 3, the peak of the sound absorption coefficient in the duct D, which includes the foam resin layer 2 having the foaming ratio of 2.5, is about 1.4 times higher than the peak of the sound absorption coefficient in the duct B, which includes the foam resin layer 2 having the foaming ratio of 0, and the sound absorption coefficient in the duct D is high for a wide sound range.

From above results, when the structure 1 according to the embodiment of the present invention is applied to the duct which is an example of the vehicle structure, the duct exhibits high sound absorption with respect to the sound (e.g. air conditioner sound) from the side of the inner wall formed in the cylindrical portion 2C. Further, when the structure 1 is applied to a door trim which is an example of the vehicle structure, the door trim exhibits high sound absorption with respect to the sound (e.g. music in the vehicle) from the side of the inner wall formed in the cylindrical portion 2C.

4-2. Sound Absorption Coefficient for Input Sound from Side of Outer Wall of Cylindrical Portion 2C

Figure 5:
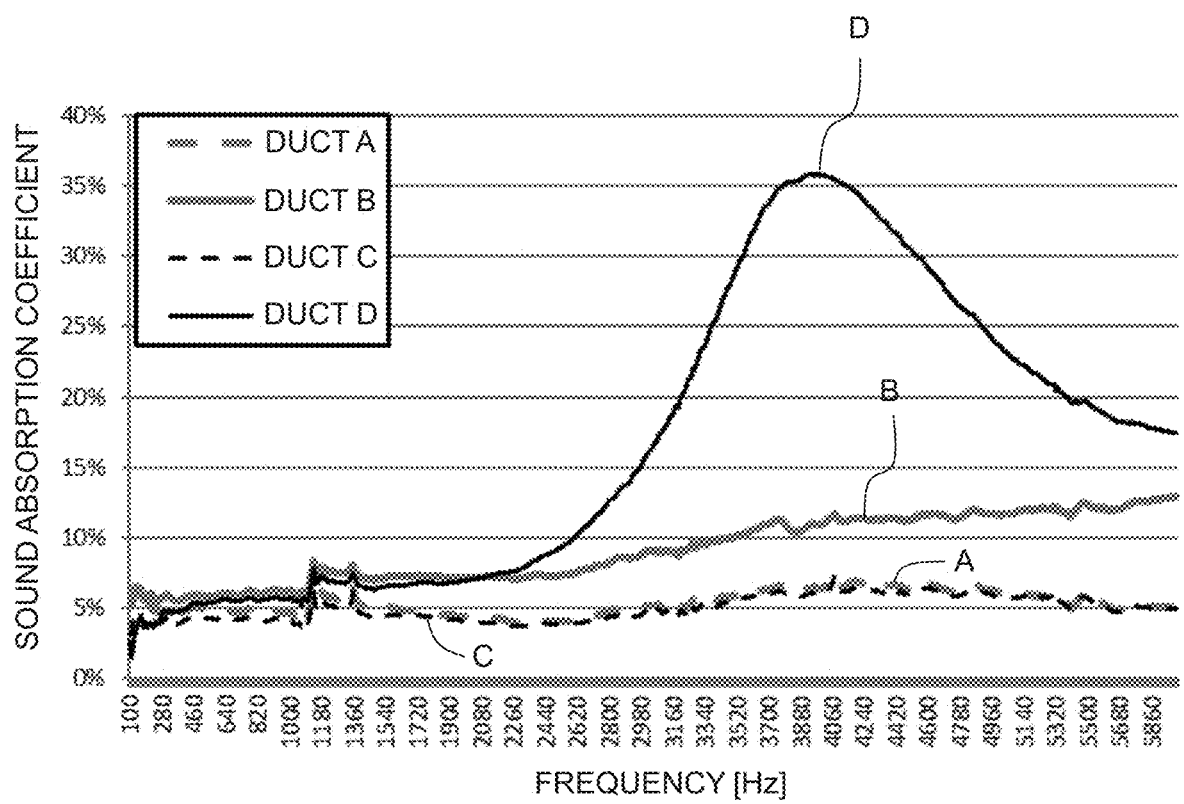
FIG. 5 is a graph showing measuring results of the sound absorption coefficient with respect to input sound from a side of an outer wall formed in the cylindrical portion 2C.

FIG. 5 is a graph illustrating the measurement results of the sound absorption coefficient with respect to the input sound from the side of the outer wall (the sound absorbing layer 3) of the cylindrical portion 2C. The sound absorption coefficients of the ducts A and C, including no sound absorbing layer 3, are substantially equal. In the ducts B and D including the sound absorbing layer 3, sound absorption coefficient peaks reach 13% and 36% respectively, compared with the ducts without the sound absorbing layer 3. In the duct D, the sound absorption coefficient peaks are seen when the input sound is in a range of 3,700 to 4,200 Hz. In the duct B, the sound absorption coefficient and frequency are in a substantially proportional relationship, and the graph have no peak. As shown the results of the ducts B and D, when the duct includes the sound absorbing layer 3, the peak of the sound absorption coefficient in the duct D, which includes the foam resin layer 2 having the foaming ratio of 2.5, is about 2.8 times higher than the peak of the sound absorption coefficient in the duct B, which includes the foam resin layer 2 having the foaming ratio of 0. In the duct D, the peaks of the sound absorption coefficient shown in FIGS. 4 and 5 are substantially equal. Then, the sound absorption coefficient shown in FIG. 5 is higher for a wide sound range than the sound absorption coefficient shown in FIG. 4. Further, in the duct B, the peak of the sound absorption coefficient shown in FIG. 4 is higher than the peak of the sound absorption coefficient shown in FIG. 5, and the sound absorption coefficient shown in FIG. 5 is a predetermined value or more for a wide sound range.

From above results, when the structure 1 according to the embodiment of the present invention is applied to the duct which is an example of the vehicle structure, the duct exhibits high sound absorption with respect to the sound (e g running sound caused by the vehicle, and road surface sound during running) from the side of the outer wall formed in the structure 1. In particular, as shown the results of FIGS. 4 and 5, the structure 1 (duct D) has extremely high sound absorption with respect to the sound from the side of the outer wall formed in the structure 1. Further, when the structure 1 is applied to the door trim which is an example of the vehicle structure, the door trim exhibits high sound absorption with respect to the sound (e g running sound caused by the vehicle, and road surface sound during running) from the side of the outer wall formed in the cylindrical portion 2C.

Another Embodiment

The present embodiment may be applicable to followings.
Nonwoven fabric is used as the sound absorbing layer 3.
The sound absorbing layer 3 is laminated near an outlet of the foam resin layer 2.

DESCRIPTION OF REFERENCE SIGNS

1: structure
2: foam resin layer
2c: cylindrical portion
3: sound absorbing layer
4: speaker
5: microphone
6: molding machine
7: resin supply device
11: raw resin
11a: molten resin
12: hopper
13: extruder
13a: cylinder
16: injector
17: accumulator
17a: cylinder
17b: piston
18: head
19: split mold
20: split mold
23: parison
23b: burr
25: connecting pipe
27: connecting pipe
30: thin tube

The invention claimed is:

1. A structure for vehicles comprising:
a cylindrical portion formed of a foam resin layer;
a sound absorbing layer laminated on at least a part of the cylindrical portion provided in an outside of the cylindrical portion; wherein
the foam resin layer is formed of a foam material having a foaming ratio of 1.1 to 8 times,
the foam resin layer is made from foamed polyolefin,
the foam resin layer has a closed-cell structure;
the sound absorbing layer is formed of a foam material having a foaming ratio of 10 to 30 times,
the sound absorbing layer is laminated on the foam resin layer,
the sound absorbing layer is made from foamed polyurethane,
the sound absorbing layer having an open-cell structure, and
a value obtained by dividing a thickness of the sound absorbing layer by a thickness of the foam resin layer is 2 to 10, and
the sound absorbing layer is provided so as to partially cover the cylindrical portion.

2. The structure for vehicles of claim 1, wherein
the sound absorbing layer is stuck to the foam resin layer with a double-sided tape or a bonding agent.

3. The structure for vehicles of claim 1, wherein
the sound absorbing layer is laminated so as to be directed downwardly in a state that an air conditioning duct comprising the structure for vehicles is attached to the vehicle.

4. The structure for vehicles of claim 1, wherein
the cylindrical portion is formed by blow-molding a cylindrical parison formed by extruding molten resin with a foaming agent added therein, and
the sound absorbing layer is laminated on the cylindrical portion after the blow molding.

5. The structure for vehicles of claim 1, wherein
the foam resin layer is formed of a foam material having a foaming ratio of 1.2 to 4 times,
thee sound absorbing layer is formed of a foam material having a foaming ratio of 15 to 25 times, and
a value obtained by dividing a thickness of the sound absorbing layer by a thickness of the foam resin layer is 2 to 2.5.

* * * * *